United States Patent
Wang et al.

(10) Patent No.: US 11,909,564 B1
(45) Date of Patent: Feb. 20, 2024

(54) ANGULAR DOMAIN CHANNEL ESTIMATION METHOD BASED ON MATRIX RECONSTRUCTION FOR SYMMETRICAL NONUNIFORM ARRAY

(71) Applicant: Southwest Jiaotong University, Chengdu (CN)

(72) Inventors: Yanyan Wang, Chengdu (CN); Qidi Li, Chengdu (CN); Li Li, Chengdu (CN); Xianfu Lei, Chengdu (CN); Xiaohu Tang, Chengdu (CN)

(73) Assignee: Southwest Jiaotong University, Chengdu (CN)

(*) Notice: Subject to any disclaimer, the term of this patent is extended or adjusted under 35 U.S.C. 154(b) by 0 days.

(21) Appl. No.: 18/242,023

(22) Filed: Sep. 5, 2023

(30) Foreign Application Priority Data

Sep. 5, 2022 (CN) .......................... 202211076303.2

(51) Int. Cl.
*H04L 25/02* (2006.01)

(52) U.S. Cl.
CPC ...... *H04L 25/0256* (2013.01); *H04L 25/0204* (2013.01); *H04L 25/0242* (2013.01)

(58) Field of Classification Search
CPC ............. H04L 25/0256; H04L 25/0204; H04L 25/0242
See application file for complete search history.

(56) References Cited

U.S. PATENT DOCUMENTS

2019/0326959 A1* 10/2019 Davydov ............. H04B 7/0469
2020/0342632 A1* 10/2020 Frumkin .................. G06T 9/002

* cited by examiner

*Primary Examiner* — Sung S Ahn
(74) *Attorney, Agent, or Firm* — Bayramoglu Law Offices LLC

(57) ABSTRACT

An angular domain channel estimation method based on matrix reconstruction for a symmetrical nonuniform array is a combined two-stage channel estimation and channel equalization scheme provided based on an SNLA model. In a first stage, a matrix reconstruction method is used to estimate a path AOA, and compared with traditional channel estimation based on ULA, the matrix reconstruction method achieves a higher resolution ratio. In a second stage, an LS method is used to obtain a path gain. According to the angular domain channel estimation method, a mean square error of channel estimation, a bit error of data transmission and complexity of a traditional scheme are significantly reduced. A simulation result indicates that compared with the traditional method, the angular domain channel estimation method can achieve a lower MSE and BER.

1 Claim, 5 Drawing Sheets

ANGULAR DOMAIN CHANNEL ESTIMATION METHOD BASED ON MATRIX RECONSTRUCTION FOR SYMMETRICAL NONUNIFORM ARRAY

CROSS REFERENCE TO THE RELATED APPLICATIONS

This application is based upon and claims priority to Chinese Patent Application No. 202211076303.2, filed on Sep. 5, 2022, the entire contents of which are incorporated herein by reference.

TECHNICAL FIELD

The present invention belongs to the technical field of wireless communication, and particularly relates to an angular domain channel estimation method based on matrix reconstruction for a symmetrical nonuniform array.

BACKGROUND

To meet the requirement of quality of service (QoS), coherent transmission is widely applied to a wireless communication system in the commercial field, and channel estimation is one of the necessary steps. Channel state information (CSI) is obtained by sending and testing a pilot signal. In recent years, with the development of the Internet of Things (IoT), a multi-antenna array is widely regarded as a necessary deployment of a base station (BS) supporting large-scale connection. However, with the increase of the number of antennas, the pilot overhead of CSI and the signal process complexity become higher and higher.

Existing channel estimation schemes under a multi-antenna system can be divided into two categories: a channel estimation based on uniform linear array (LTA) and a channel estimation based on nonuniform linear array (NLA). In the channel estimation based on ULA, antenna units are distributed in BS. Least squares (LS) and minimum mean square error (MMSE) channel estimation criteria are usually used in cooperation with a LTA configuration. Due to the limited number of resolvable scattering bodies in a radio propagation path, a parameter physical channel model may be represented by two factors, that is, angle-of-arrivals (AOAs) (which is also called direction-of-arrivals (DOAs) in array signal processing) and a gain of each scattering path.

At present, NLA is also used for wireless communication, which can improve the accuracy of the channel estimation. By using the same number of antenna elements, compared with ULA, NLA can achieve a higher degree of freedom and higher estimation resolution ratio. This shows that special antenna distribution is beneficial to channel estimation, At present, the prior art has proposed any array, where a channel array manifold matrix is approximately divided into a Bessel matrix and a Vandermonde matrix by a Jacobian matrix. The channel covariance matrix is obtained by a low rank structural covariance reconstruction (LRSCR) algorithm, and angle information is estimated by Vandermonde decomposition lemma. However, when most AOAs are concentrated in a certain azimuth angle, the current channel estimation method will significantly reduce the performance. Some technologies have proposed the structural characteristics of a nested array, so that the channel estimation accuracy is improved; however, due to the large aperture of the nested array, the channel estimation complexity is higher.

SUMMARY

For the above problem, the present invention provides a symmetrical nonuniform linear array (SNLA) for single-user uplink transmission. Channel information is divided into channel angle information and channel gain information. A combined two-stage channel estimation and channel equalization scheme is proposed by the proposed SNLA geometric structure. In a first stage, a matrix reconstruction method is used to estimate a path AOA, and compared with a traditional channel estimation based on ULA, the method achieves a higher resolution ratio. In a second stage, an LS method is used to obtain a path gain. Finally, based on the estimated channel information, a receiving signal is equalized by a zero forcing (ZF) algorithm.

The present invention has the technical solution as follows:

an angular domain channel estimation method based on matrix reconstruction for a symmetrical nonuniform array defines that a system includes a base station with M antennas and a user with a single antenna. The M antennas form a symmetrical nonuniform linear array and the symmetrical nonuniform linear array is divided into a dense symmetrical uniform linear subarray, a first sparse uniform linear subarray and a second sparse uniform linear subarray; the dense symmetrical uniform linear subarray has $2M_1+1$ array elements; each of the array elements has a spacing d, where $d=\lambda/2$, and $\lambda$ is a half of a wavelength; each of the first sparse uniform linear subarray and the second sparse uniform linear subarray includes $M_2$ array elements, each of the array elements has a spacing $(M_1+1)d$, and $M=2(M_1+M_2)+1$; the first sparse uniform linear subarray and the second sparse uniform linear subarray are respectively deployed on two sides of the dense symmetrical uniform linear subarray; an array element in a middle of the dense symmetrical uniform linear subarray is selected as a reference array element, and rest array elements are symmetrically distributed by taking the reference array element as a center; since a wireless channel experiences limited scattering propagation, the channel has a sparse multi-path structure and it is assumed that the user has L scattering paths. The channel estimation method includes:

performing path angle estimation based on a matrix reconstruction method, specifically as follows:

enabling a user side to send a training signal $s_t$, and in all snapshots, enabling $|s_t|=1|s_t|=1$, then a receiving signal at a position of a base station antenna is:

$$y_t = h_t s_t + n_t = Ag_t s_t + n_t$$

where $h_t$ is a user uplink channel, $n_t$ is an additive white Gaussian noise obeying complex Gaussian distribution $CN(0, \sigma^2 I)$, and $Ag_t$ is a form of matrix multiplication of the channel $h_t$:

$$g_t = [g_{1,t}, \ldots, g_{L,t}]^T \in C^{L \times 1}$$

$$A = [a(\theta_1), \ldots, a(\theta_L)] \in C^{M \times L}$$

$g_{l,t}$ being the channel gain of the user at a time t and at an $l^{th}$ scattering path and obeying Gaussian distribution $g_{l,t} \sim CN(0,1)$, $\theta_l$ representing an angle-of-arrivals of the $l^{th}$ path of the user, and the vector $a(\theta_l) \in C^{M \times 1}$ representing an array manifold vector, $l=1, \ldots L$, and L representing each user has L scattering paths;

enabling $x_t=g_t s_t \in C^{L \times 1}$ to obtain a receiving signal covariance matrix which may be represented as:

$$R_y = E\{y_t y_t^H\} = R_h + \sigma^2 I = AR_x A^H + \sigma^2 I$$

where $R_h = E\{h_t h_t^H\}$, $R_x = E\{x_t x_t^H\}$;

vectorizing the covariance matrix $R_y$ to obtain a vector z:

$$z = vec(R_y) = \tilde{A}p + \sigma_m^2 \vec{I_m}$$

where $\tilde{A} = A^* \odot A \in C^{|M|^2 \times L}$, $p=[g_1^2 \sigma_1^2, \ldots, g_L^2 \sigma_L^2]^T$, $g_l^2$ and $\sigma_l^2$ respectively represent a transmission signal power and a path gain power, $1 \leq l \leq L$, $\sigma_m^2$ is a noise power, $\vec{I_m} = [e_1^T, e_2^T, \ldots, e_M^T]^T$, $e_i$ is a column vector, except that an $i^{th}$ position is 1, the rest are 0, the vector z is equivalent to receiving data with an array manifold matrix $(A^* \odot A)$, and array element positions of the vector z are given by a set $D=\{d_i - d_j\}$, $\forall i,j=1, 2, \ldots, M$; repeated elements in the set $D=\{d_i - d_j\}$, $\forall i,j=1, 2, \ldots, M$ are deleted to obtain a set B, integer elements of the set B correspond to the position of a virtual array element, the repeated data in the receiving data z is removed and the corresponding rows are rearranged to cause the rows to correspond to the position of a virtual array to obtain a new vector:

$$\tilde{z} = A_B p + \sigma_m^2 e_0$$

where $\tilde{z} \in C^{|B| \times 1}$ is a receiving signal of the virtual array, and $A_B \in C^{|B| \times L}$ is an array manifold matrix corresponding to the virtual array, $|B|=M+2(M_1+(M_1+1)M_2)$, $e_0 \in C^{|B| \times 1}$ and except that a central term is 1, the rest are 0;

reconstructing the received data $\tilde{z}$ into the covariance matrix $$\tilde{R}_y \in C^{\left(\frac{|B|+1}{2}\right) \times \left(\frac{|B|+1}{2}\right)}$$

of the virtual array, the matrix $\tilde{R}_y$ having the toeplitz matrix property, that is, the elements on the same diagonal line being the same, so during the construction of the matrix $\tilde{R}_y$, only constructing data in the first column and the first row; constructing previous $$\frac{|B|+1}{2}$$

data in the vector $\tilde{z}$ into a first column of the matrix $\tilde{R}_y$, constructing last $$\frac{|B|-1}{2}$$

data in the vector $\tilde{z}$ into the first row of the matrix $\tilde{R}_y$, and then complementing $\tilde{R}_y$ according to the property that the elements on the same diagonal line of $\tilde{R}_y$ are the same; based on feature value decomposition of $\tilde{R}_y$, it may be represented as:

$$\tilde{R}_y = [U_S \ U_N] \begin{bmatrix} \Sigma_S & 0 \\ 0 & \Sigma_N \end{bmatrix} \begin{bmatrix} U_S^H \\ U_N^H \end{bmatrix}$$

where $U_S$ is a signal subspace formed by a feature vector corresponding to a large feature value, and $U_N$ is a noise subspace formed by a feature vector corresponding to a small feature value;

multiplying both sides of the matrix by $U_N$ to obtain:

$$\tilde{R}_y U_N = (A_1 R_x A_1^H + \sigma_m^2 I) U_N = \sigma_m^2 U_n,$$

where $A_1 \in C^{(|B|+1)/2 \times L}$ represents an array manifold matrix corresponding to the virtual array and meets:

$$A_1 R_x A_1^H U_N = 0$$

since the column vector of $A_1$ corresponds to a signal transmitting direction, a direction of a signal source may be estimated by the characteristic. Due to the influence of the noise, the general signal subspace and the noise subspace cannot be completely orthogonal, and based on a multiple signal classification (MUSIC) algorithm, a spatial spectrum signal $P_{music}(\hat{\theta}_l)$ is defined as:

$$P_{music}(\hat{\theta}_l) = \frac{1}{\tilde{a}(\theta_l)^H U_N U_N^H \tilde{a}(\theta_l)}$$

where in a case that the denominator $\tilde{a}(\hat{\theta}_l)^H U_N U_N^H \tilde{a}(\hat{\theta}_l)$ reaches a minimum value, $\tilde{a}(\hat{\theta}_l)$ is the $l^{th}$ column of vector of the matrix $A_1$, $P_{music}(\hat{\theta}_l)$ reaches a maximum value, the direction-of-arrivals $\hat{\theta}_l$ may be estimated according to the peak value of $P_{music}(\hat{\theta}_l)$. Therefore, the path angle information is $\hat{\theta} = [\hat{\theta}_1, \hat{\theta}_2, \ldots, \hat{\theta}_L]$.

Path gain estimation is performed, specifically as follows:

obtaining an array manifold matrix $\hat{A}$ based on the obtained $\hat{\theta}$, sending a pilot signal $u_t$, estimating path gains in different time blocks based on the obtained $\hat{A}$, and constructing a cost function:

$$J(\hat{g}_t) = \left\| \frac{1}{u_t} y_t - \hat{A} \hat{g}_t \right\|^2 = \left( \frac{1}{u_t} y_t - \hat{A} \hat{g}_t \right)^H \left( \frac{1}{u_t} y_t - \hat{A} \hat{g}_t \right) = \left(\frac{1}{u_t}\right)^2 y_t^H y_t - \frac{1}{u_t} y_t^H \hat{A} \hat{g}_t - \frac{1}{u_t} \hat{g}_t^H \hat{A}^H y_t + \hat{g}_t^H \hat{A}^H \hat{A} \hat{g}_t$$

minimizing the cost function to obtain a channel gain estimation $\hat{g}_t$, specifically, by calculating a partial derivative of the cost function relative to $\hat{g}_t$, obtaining:

$$\frac{\partial J(\hat{g}_t)}{\partial \hat{g}_t} = -\frac{1}{u_t} y_t^H \hat{A} + \hat{g}_t^H \hat{A}^H \hat{A}$$

in a case that $$\hat{g}_t^H \hat{A}^H \hat{A} = \frac{1}{u_t} y_t^H \hat{A},$$

a solution or the channel gain being:

$$\hat{g}_t = \frac{1}{u_t} (\hat{A}^H \hat{A})^{-1} \hat{A}^H y_t, t = 1, \ldots, T$$

where T is a time block, then within one time block, and the whole channel estimation result expression is:

$$\hat{h}_t = \hat{A}\hat{g}_t, t=1, \ldots, T.$$

The above scheme is the channel estimation process for a single-user model. In a case of a multi-user system, the channel of each user is estimated circularly and sequentially based on the single user so as to obtain multi-user channel information.

The present invention has the following beneficial effects: the mean square error of channel estimation, a bit error of data transmission and complexity of a traditional scheme are significantly reduced. A simulation result indicates that compared with the traditional method, the channel estimation method provided by the present invention can achieve a lower MSE and BER.

DETAILED DESCRIPTION OF THE EMBODIMENTS

The technical solution of the present invention will be clearly and completely described below with reference to the accompanying drawings and simulation examples, so that those skilled in the art can better understand the present invention.

Figure 1:
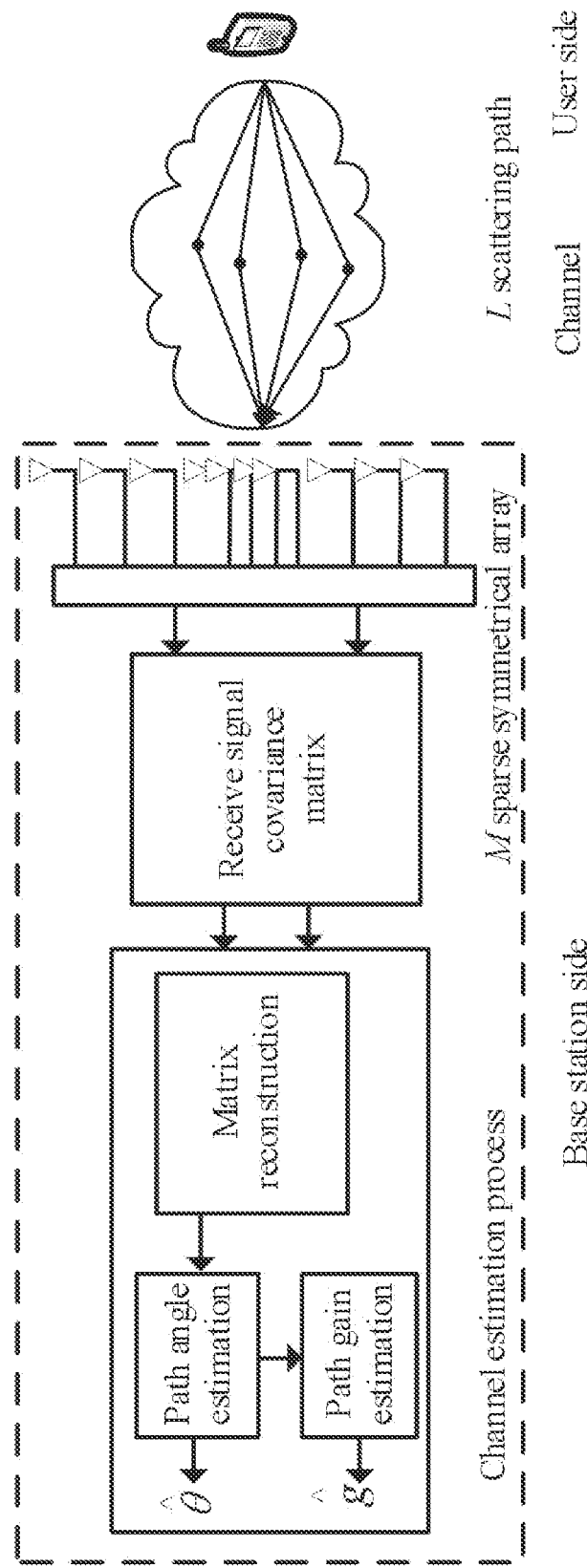
FIG. 1 is a sparse channel estimation system model based on SNLA.
Figure 2:
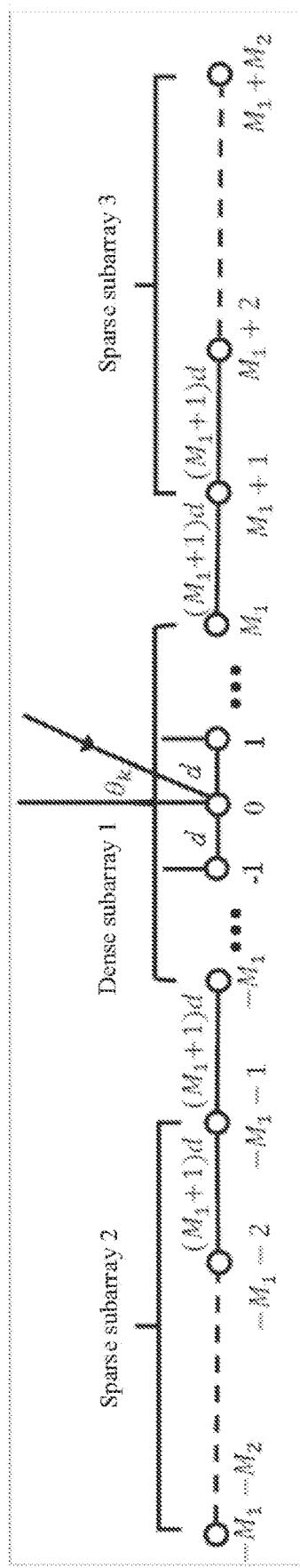
FIG. 2 is a symmetrical nonuniform array geometric structure.

The present invention considers a single-user communication system model, as shown in FIG. 1. The communication system is composed of a M-antenna base station and a single-antenna user, where $M=2(M_1+M_2)+1$. At the BS side, an SNLA is designed and includes a dense symmetrical uniform linear subarray 1 and two sparse uniform linear subarrays, where the subarray 2 and the subarray 3 are respectively located on a left side and a right side of the subarray 1, as shown in FIG. 2. The dense subarray 1 totally has $2M_1+1$ elements, and each array has a spacing d, where $d=\lambda/2$, and $\lambda$ is a half of a wavelength. Both the sparse subarray 2 and the sparse subarray 3 include $M_2$ elements, and each array has a spacing $(M_1+1)d$. For channel estimation, a matrix reconstruction (MR) is provided to estimate a channel path angle based on a Vandermonde structure of SNLA.

Since a wireless channel will experience limited scattering propagation to cause the channel to have a sparse multi-path structure, it is assumed that the user has L scattering paths. Then, the channel may be described by a geometric model with L(L<M) scattering bodies, where each path is represented by a path angle and a path gain. In this channel modeling, the angle of the scattering path is kept unchanged within a relatively long time, but the channel coefficient is changed very quickly, so the user uplink channel $h_t$ may be represented as:

$$h_t = \sum_{l=1}^{L} g_{l,t} a(\theta_l), \forall t, k = 1, \ldots, K \quad (1)$$

where $g_{l,t}$ is defined as the channel gain of the user at the time t and at an $l^{th}$ scattering path, obeying complex Gaussian distribution $g_{l,t} \sim CN(0,1)$. $\theta_l$ represents the (DOA) of the $l^{th}$ path, and the vector $a(\theta_l) \in C^{M \times 1}$ represents the array manifold vector, having the following forms:

$$a(\theta_l) = [e^{-j\varphi d_1}, \ldots, e^{-j\varphi s_M}]^T \quad (2)$$

where $$\varphi = \frac{2\pi}{\lambda} \sin(\theta_{k,l}), d_i (1 \leq i \leq M)$$

represents the distance from the $i^{th}$ array element to a reference element. It can be clearly seen from FIG. 2 that, from left to right, the index information of the array is respectively $-M_1-M_2, \ldots, -M_1-1, -M_1, \ldots, 0, \ldots, M_1, M_1+1, \ldots, M_1+M_2$, the array is placed at the position $d_i$, then $d_i=(-M_1-M_2(M_1+1))d, \ldots, -(2M_1+1)d, -M_1d, \ldots, 0, \ldots, M_1d, (2M_1+1)d, \ldots, (M_1+M_2(M_1+1))d$. The channel is represented as a form of matrix multiplication, and the expression $h_t$ in (1) may be represented as:

$$h_t = Ag_t \quad (3)$$

where $g_t=[g_{1,t}, \ldots, g_{L,t}]^T \in C^{L \times 1}$, $A=[a(\theta_1), \ldots, a(\theta_L)] \in C^{M \times L}$.

Figure 3:
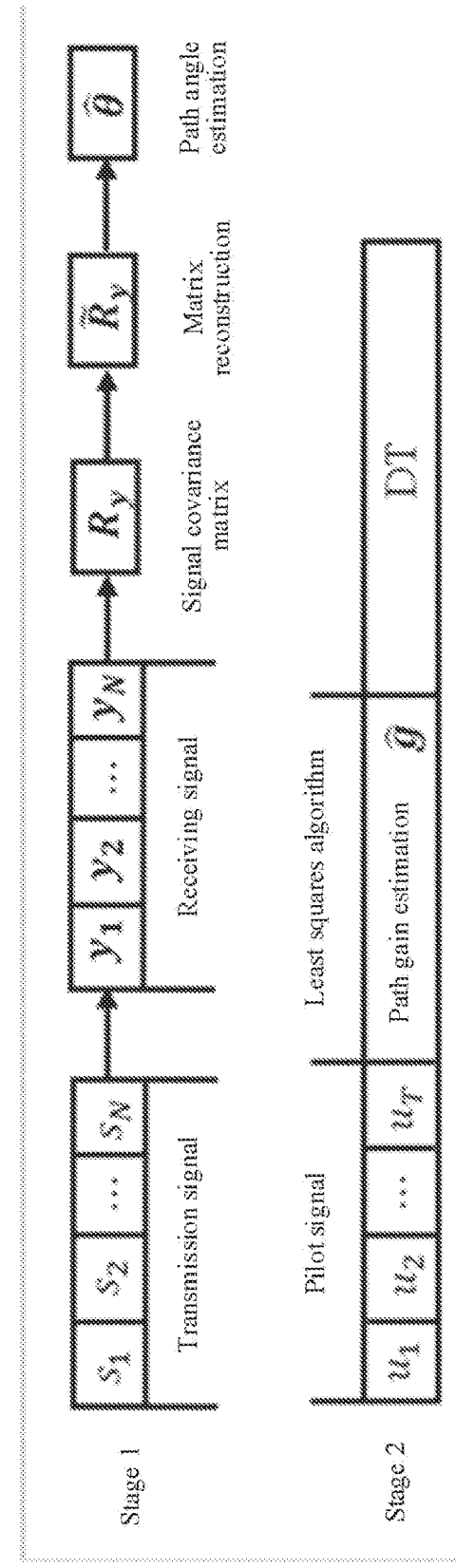
FIG. 3 is a two-stage channel estimation signal processing process.

In the uplink channel estimation, the user side sends a training signal $s_t$, and ensures $|s_t|=1$ in all snapshots. The receiving signal at the position of the base station antenna may be represented as:

$$y_t = h_t s_t + n_t = Ag_t s_t + n_t \quad (4)$$

where $n_t$ is defined as an additive white Gaussian noise obeying complex Gaussian distribution $CN(0,\sigma^2 I)$. According to (4), at the time t, the covariance matrix of the receiving signal may be represented as:

$$R_y = E\{y_t y_t^H\} = R_h + \sigma^2 I = AR_x A^H + \sigma^2 I \quad (5)$$

where $R_h = E\{h_t h_t^H\}$, $R_x = E\{x_t x_t^H\}$. According to (5), the channel path angle information may be estimated based on the MR method. It is assumed that in a block fading channel, the path angle is changed slowly and is kept constant in a block, but the path gain is changed very quickly. Therefore, the present invention designs a signal processing framework of two-stage channel estimation considering the difference of the path angle and the path gain changed with time, as shown in FIG. 3. At a first stage, the channel covariance matrix $R_y$, is Obtained by the array signal processing related method, and the path angle information is retrieved based on the MR method. During the estimation of the channel angle information, it is only necessary to know the covariance matrix of the receiving signal. Therefore, at the first stage, the channel angle information can be acquired without sending the pilot signal. At a second stage, the path gain is obtained by the least square method by sending pilot information in different blocks. Therefore, in signal processing, CSI estimation is divided into two sub-problems: path angle estimation and path gain estimation.

The present invention converts the channel estimation into the DOA estimation problem and the path gain estimation problem. In more detail, first, the MR method based on the SNAL structure is proposed to estimate DOA. Then, the channel path gain is Obtained by an LS method. The M-dimensional channel covariance matrix may be expanded as $(M+2(M_1+(M_1+1)M_2)+1)/2$-dimensional virtual covariance matrix by the MR method, thereby increasing the degree of spatial freedom and improving the accuracy of the channel estimation.

The path angle estimation based on the matrix reconstruction is:

according to the receiving signal expression in the formula (4), $x_t=g_t s_t \in C^{L \times 1}$, the receiving signal may be further represented as:

$$y_t = Ag_t s_t + n_t = Ax_t + n_t \quad (6)$$

Since the channel path gain information is changed quickly within a block time, it is assumed that the channel has L paths, and after N snapshots, $X \in C^{L \times T}$ may be represented as:

$$X = \begin{pmatrix} g_{11}s_1 & \cdots & g_{1N}s_N \\ g_{21}s_1 & \cdots & g_{21}s_N \\ \vdots & \ddots & \vdots \\ g_{L1}s_1 & \cdots & g_{L1}s_N \end{pmatrix} \quad (7)$$

In the formula (7), each row of X is independent and irrelevant. Therefore, the autocorrelation matrix of $x_t$ is a diagonal matrix. $Q_i=g_i^2 \sigma_i^2 (1 \leq i \leq L)$ is defined, where $g_i^2$ and $\sigma_i^2 (1 \leq i \leq L)$ respectively represent a transmission signal power and a path gain power, and the obtained covariance matrix of the receiving signal is:

$$R_y = AR_x A^H + \sigma_m^2 I = A \begin{pmatrix} Q_1 & & & \\ & Q_2 & & \\ & & \ddots & \\ & & & Q_L \end{pmatrix} A^H + \sigma_m^2 I \quad (8)$$

The element in the covariance matrix $[R_y]_{m,n}(1 \leq m \leq M, 1 \leq n \leq M)$ may be regarded as the receiving data at the position coordinate $d_m-d_n$ array element, so one array element can be virtually created at the position where no array element is originally through the known physical array element. The covariance matrix $R_y$ is vectorized to obtain the following vector:

$$z=vec(R_y)=vec(AR_xA)+\sigma_m^2 vec(I)=(A^* \odot A)p+\sigma_m^2 vec(I)=\tilde{A}p+\sigma_m^2 \vec{I_m} \quad (9)$$

where $\tilde{A}=A^* \odot A \in C^{|M|^2 \times L}$, $p=[g_1^2 \sigma_1^2, \ldots, g_L^2 \sigma_L^2]^T$, $\sigma_m^2$ is a noise power, $\vec{I_m}=[e_1^T, e_2^T, \ldots, e_M^T]^T$, $e_i$ is a column vector, and except that an $i^{th}$ position is 1, the rest are 0. Similar to the formula (6), the vector z is equivalent to the receiving data with the array manifold matrix $(A^* \odot A)$ and corresponds to a larger array, and the array element position is given by a set $D=\{d_i-d_j\}$, $\forall i,j=1,2,\ldots,M$.

Since the difference value will be the same when the difference value between any pair of original physical array elements is calculated, that is, the same array element is virtually created, so the vector z is redundant. The repeated elements in the set D are deleted to obtain a set B, the integer elements of the set B correspond to the position of the virtual array element, the repeated data in the receiving data z is removed, and the corresponding rows are rearranged to cause the row to correspond to the virtual array position to obtain a new vector:

$$\tilde{z}=A_B p+\sigma_m^2 e_0 \quad (10)$$

where $\tilde{z} \in C^{|B| \times 1}$ is a receiving signal of the virtual array, and $A_B \in C^{|B| \times L}$ is an array manifold matrix corresponding to the virtual array, $|B|=M+2(M_1+(M_1+1)M_2)$, $e_0 \in C^{|B| \times 1}$, and except that a central term is 1, the rest are 0.

The received data $\tilde{z}$ is reconstructed into the covariance matrix $$\tilde{R}_y \in C^{\left(\frac{|B|+1}{2}\right) \times \left(\frac{|B|+1}{2}\right)}$$

of the virtual array, where the matrix $\tilde{R}_y$ has the toeplitz matrix property, that is, the elements on the same diagonal line are the same. Therefore, during the construction of the matrix $\tilde{R}_y$, only data in the first column and the first row is required to be constructed; constructing the previous $$\frac{|B|+1}{2}$$

data in me vector $\tilde{z}$ into me first column of the matrix $\tilde{R}_y$, the last $$\frac{|B|-1}{2}$$

data in the vector $\tilde{z}$ is constructed into the first row of the matrix $\tilde{R}_y$, and then $\tilde{R}_y$ is completed according to the property that the elements on the same diagonal line of $\tilde{R}_y$ are the same. Based on feature value decomposition of $\tilde{R}_y$, it may be represented as:

$$\tilde{R}_y = [U_S \ U_N] \begin{bmatrix} \sum_S & 0 \\ 0 & \sum_N \end{bmatrix} \begin{bmatrix} U_S^H \\ U_N^H \end{bmatrix} \quad (11)$$

where $U_S$ is a signal subspace formed by a feature vector corresponding to a large feature value and $U_N$ is a noise subspace formed by a feature vector corresponding to a small feature value. Both sides of the matrix are multiplied by $U_N$ to obtain:

$$\tilde{R}_y U_N=(A_1 R_x A_1^H+\sigma_m^2 I)U_N=\sigma_m^2 U_n \quad (12)$$

where $A_1 \in C^{(|B|+1)/2 \times L}$ represents an array manifold matrix corresponding to the virtual array and meets:

$$A_1 R_x A_1^H U_N=0 \quad (13)$$

Since the column vector of $A_1$ corresponds to a signal transmitting direction, a direction of a signal source may be estimated by the characteristic. Due to the influence of the noise, the general signal subspace and the noise subspace cannot be completely orthogonal, and based on a multiple signal classification (MUSIC) algorithm, a spatial spectrum signal $P_{music}(\hat{\theta}_l)$ is defined as:

$$P_{music}(\hat{\theta}_l) = \frac{1}{\tilde{a}(\theta_l)^H U_N U_N^H \tilde{a}(\theta_l)} \quad (14)$$

where in a case that the denominator $\tilde{a}(\hat{\theta}_l)^H U_N U_N^H \tilde{a}(\hat{\theta}_l)$ reaches a minimum value, $\tilde{a}(\hat{\theta}_l)$ is the $l^{th}$ column of vector of the matrix $A_1$, $P_{music}(\hat{\theta}_l)$ reaches a maximum value, the direction-of-arrivals $\hat{\theta}_l$ may be estimated according to the peak valine of $P_{music}(\hat{\theta}_l)$, thereby obtaining all path angle information $\hat{\theta}=[\hat{\theta}_1, \hat{\theta}_2, \ldots, \hat{\theta}_L]$.

Based on the expression $R_y$ in the formula (8), during the estimation of the path angle information, it is only necessary to know the signal sending statistical information. Therefore, the first stage of the channel estimation does not require the pilot signal, thereby greatly reducing the pilot overhead. In addition, for the ULA with M antennas, the maximum antenna array aperture is $(M-1)d^{[3]}$. The maximum virtual array aperture of the designed SNLA structure can be increased to $((M+2(M_1+(M_1+1)M_2)+1)/2)d$. Compared with the ULA scheme, the angle estimation accuracy of the SNLA is further improved.

The path gain estimation is:

once the path angle is estimated by the MR-based algorithm, the array manifold matrix $\hat{A}$ can be obtained. The pilot signal $u_t$ is sent at this stage, so that the path gains in different blocks can be estimated based on the obtained $\hat{A}$. To obtain the channel gain estimation $g_t$, it is necessary to minimize the following cost function:

$$J(\hat{g}_t) = \left\| \frac{1}{u_t} y_t - \hat{A}\hat{g}_t \right\|^2 = \left(\frac{1}{u_t} y_t - \hat{A}\hat{g}_t\right)^H \left(\frac{1}{u_t} y_t - \hat{A}\hat{g}_t\right) = \left(\frac{1}{u_t}\right)^2 y_t^H y_t - \frac{1}{u_t} y_t^H \hat{A}\hat{g}_t - \frac{1}{u_t} \hat{g}_t^H \hat{A}^H y_t + \hat{g}_t^H \hat{A}^H \hat{A}\hat{g}_t \quad (15)$$

By calculating a partial derivative of the cost function relative to $\hat{g}_t$, the following can be obtained:

$$\frac{\partial J(\hat{g}_t)}{\partial \hat{g}_t} = -\frac{1}{u_t} y_t^H \hat{A} + \hat{g}_t^H \hat{A}^H \hat{A} \quad (16)$$

In a case that $$\hat{g}_t^H \hat{A}^H \hat{A} = \frac{1}{u_t} y_t^H \hat{A},$$

a solution of the channel gain is:

$$\hat{g}_t = \frac{1}{u_t}\left(\hat{A}^H \hat{A}\right)^{-1} \hat{A}^H y_t, t = 1, \ldots, T \quad (17)$$

Finally, within a time block, the whole channel estimation result expression is:

$$\tilde{h}_t = \hat{A}\hat{g}_t, t=1, \ldots, T \quad (18)$$

Based on the estimated channel matrix, the communication symbol can be equalized by a ZF algorithm.

Simulation Example

Figure 4:
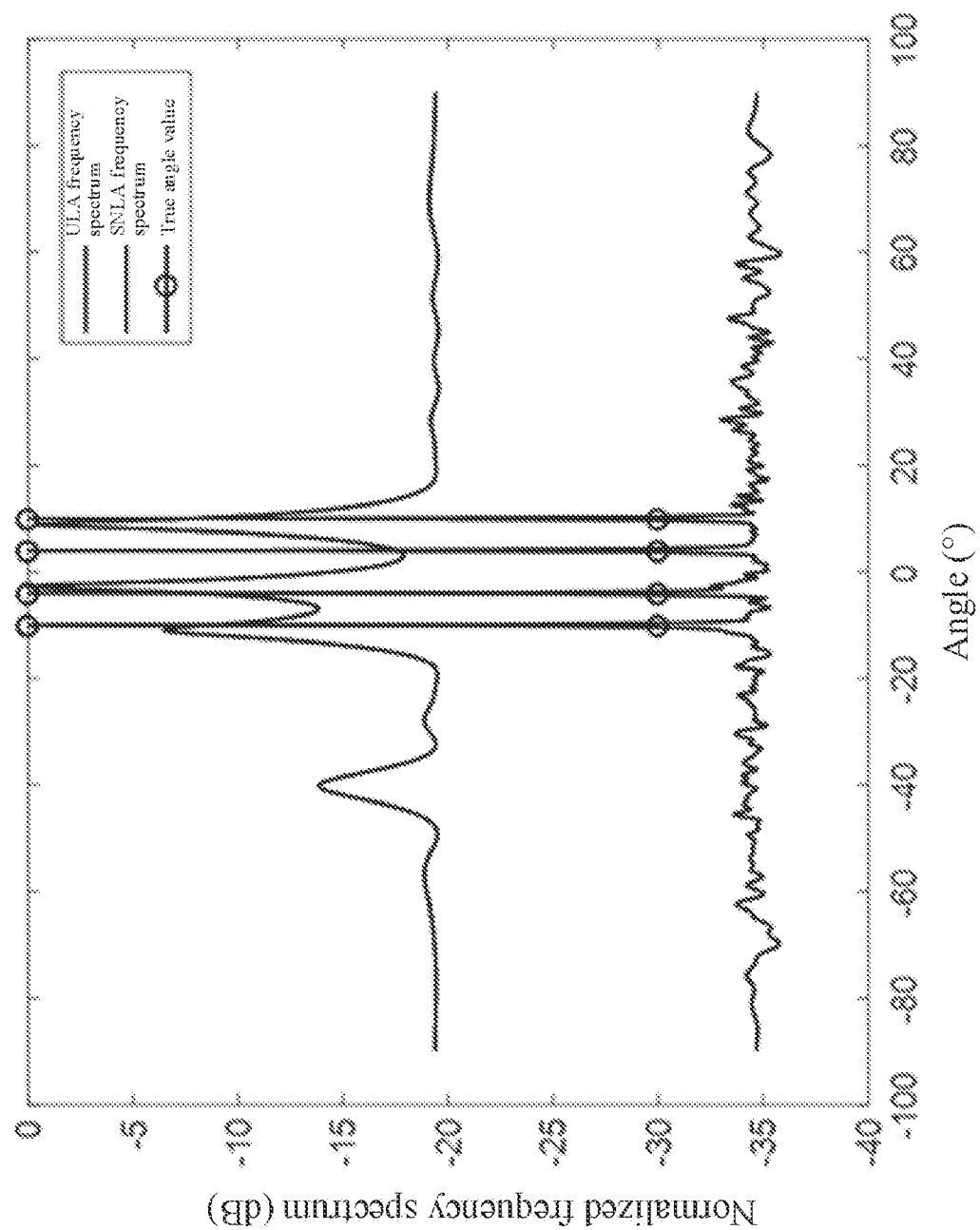
FIG. 4 is a spatially normalized frequency spectrum of SNLA and ULA.

A base station deploys an SNLA, in each Monte Carlo simulation, the channel path DOA is randomly distributed at $(-90°, 90°)$. The channel estimation property is described by a normalized mean square error (NMSE), that is, NMSE=E $\{\|h-\hat{h}\|_2^2\}/E\{\|h\|_2^2\}$, where $\hat{h} = [\hat{h}_1, \ldots, \hat{h}_T]$. The signal to noise ratio (SNR) is defined as $$10\log\frac{P_s}{\sigma^2},$$

where $P_s$ is the normalized signal power which is fixed at 1. In a single-user communication system, parameters are set as follows: M=15, K=1, L=4, T=16. To verify the angular resolution of the SNLA and ULA, this example simulates a set of normalized frequency spectrum with a dense incident wave direction, where the path angle is specified as $(-10°, -4°, 4°, 10°)$. A simulation result is shown in FIG. 4. Note: dots represent the true angle. It is observed that compared with the ULA scheme, the frequency spectrum of the SNLA is sharper in the incident wave direction. Therefore, the angle estimation accuracy based on the SNLA is higher than the ULA.

Figure 5:
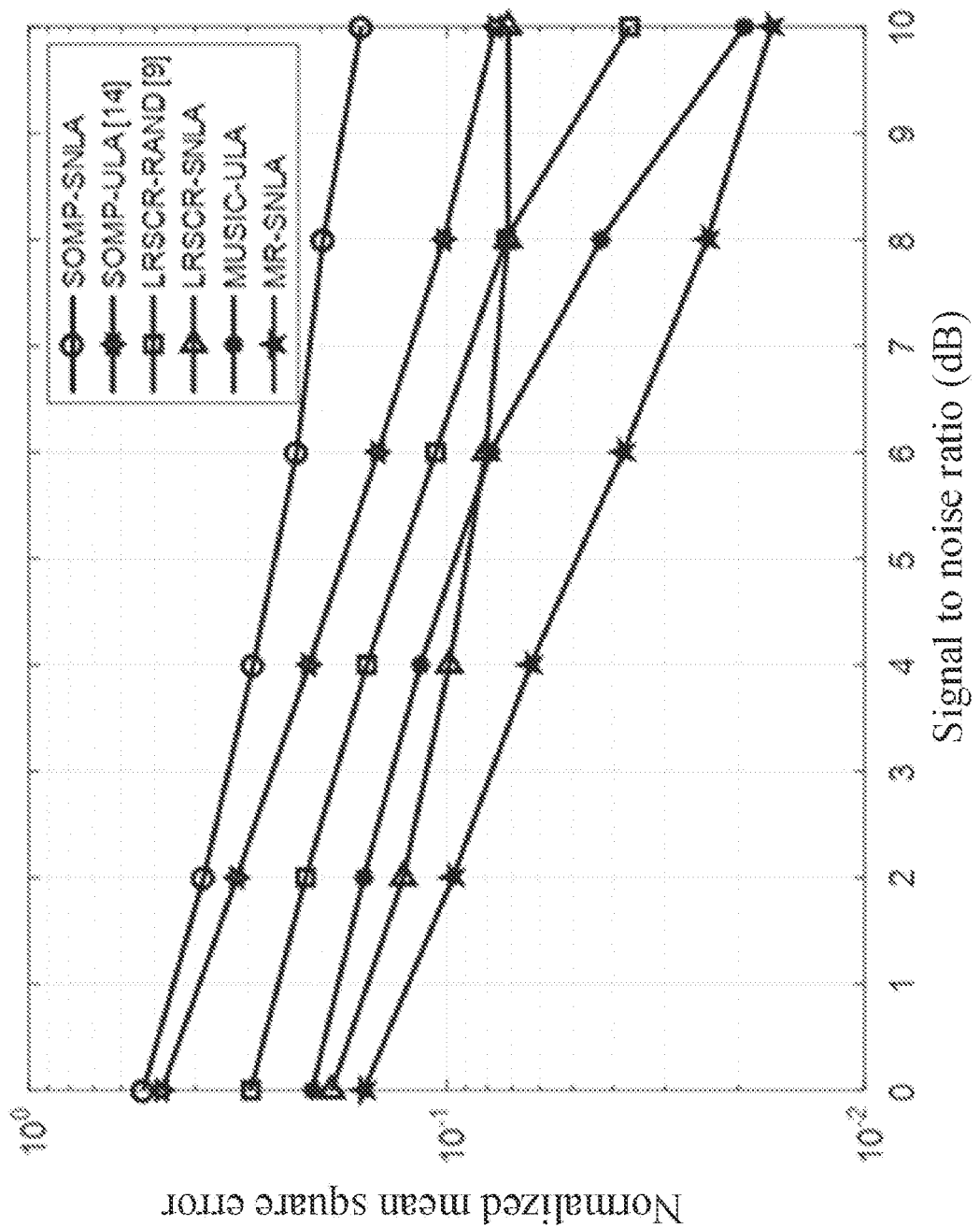
FIG. 5 is an NMSE and SNR curve graph of LRSCR, SOMP, MUSIC and MR algorithms of a single-user system.

To verify the accuracy of the provided channel estimation algorithm, the relationship curve of NMSE and SNR under different conditions is drawn in FIG. 5. In simulation, the base station antennas are respectively arranged as the SNLA, the ILIA and a random array (RAND). The path angle is set as: $(-16°, -4°, 4°, 16°)$. Therefore, the NMSE of the method (that is, MR-SNLA) of the present invention is much smaller than those of the existing simultaneous orthogonal matching pursuit (SOMP), low rank structured covariance reconstruction (LRSCR) and multiple signal classification (MUSIC) algorithms. In addition, by changing the antenna distribution at the base station, it is observed that the SNLA is more excellent than the ULA and the RAND. This is because the method of the present invention not only utilizes the sparsity of the channel, but also utilizes the geometric structure of the array, thereby improving the channel estimation accuracy.

Figure 6:
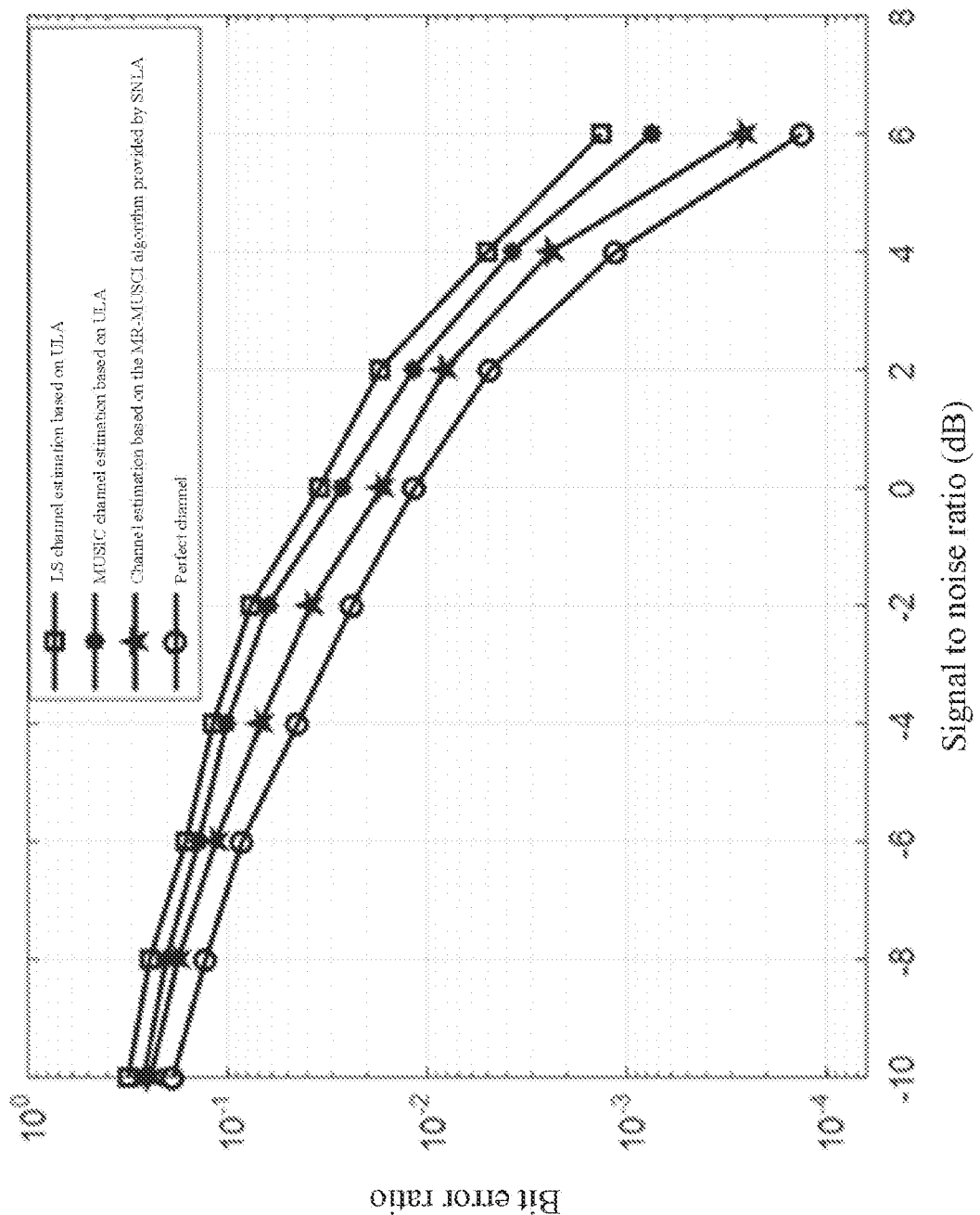
FIG. 6 is a schematic structural diagram of comparing with an ideal CSI, an SNLA CSI estimated by the provided method, a ULA CSI estimated by an MUSIC method and a bit error ratio estimated by an LS method, respectively.

To further describe the advantages of the provided method, FIG. 6 compares the BER performance of different channel estimation algorithms modulated by quadrature phase shift keying (QPSK). For different channel estimation methods, the signal is modulated by the same equalizer (that is, 7T). To maintain the fairness of comparison, the system model and parameters required by simulation are the same as those in FIG. 5. In FIG. 6, the bit error ratio of the channel estimation method provided by the present invention under the SNLA is closer to the perfect CSI condition, and has a certain advantage compared with the traditional channel estimation method.

What is claimed is:

1. An angular domain channel estimation method based on matrix reconstruction for a symmetrical nonuniform array, defining that a system comprises a base station with M antennas and a user with a single antenna, wherein the M antennas form a symmetrical nonuniform linear array and the symmetrical nonuniform linear array is divided into a dense symmetrical uniform linear subarray, a first sparse uniform linear subarray and a second sparse uniform linear subarray; the dense symmetrical uniform linear subarray has $2M_1+1$ array elements; each of the array elements has a spacing d, and $d=\lambda/2$, $\lambda$ being a half of a wavelength; each of the first sparse uniform linear subarray and the second sparse uniform linear subarray comprises $M_2$ array elements, each of the array elements has a spacing $(M_1+1)d$, and $M=2(M_1+M_2)+1$; the first sparse uniform linear subarray and the second sparse uniform linear subarray are respectively deployed on two sides of the dense symmetrical uniform linear subarray; an array element in a middle of the dense symmetrical uniform linear subarray is selected as a reference array element, and rest array elements are symmetrically distributed by taking the reference array element as a center; since a wireless channel experiences limited scattering propagation, the channel has a sparse multi-path structure and the user is defined to have L scattering paths; and the channel estimation method comprises:

performing path angle estimation based on a matrix reconstruction method, specifically as follows:

enabling a user side to send a training signal s t at a time t, and in all snapshots, enabling $|s_t|=1$, then a receiving signal at a position of a base station antenna being:

$$y_t = h_t s_t + n_t = A g_t s_t + n_t$$

wherein $h_t$ is a user uplink channel, $n_t$ is an additive white Gaussian noise obeying complex Gaussian distribution $CN(0,\sigma^2 I)$, $\sigma^2 I$ is a variance of the additive white Gaussian noise, and $Ag_t$ is a form of matrix multiplication of the channel $h_t$:

$$g_t = [g_{1,t}, \ldots, g_{l,t}]^T \in C^{L \times 1}$$

$$A = [a(\theta_1), \ldots, a(\theta_L)] \in C^{M \times L}$$

$g_{l,t}$ being a channel gain of the user at the time t and at an $l^{th}$ scattering path and obeying complex Gaussian distribution $g_{l,t} \sim CN(0,1)$, $\theta_l$ representing an angle-of-arrivals of an $l^{th}$ path of the user, and a vector $a(\theta_l) \in C^{M \times 1}$ representing an array manifold vector, l=1, ... L;

enabling $x_t = g_t s_t \in C^{L \times 1}$ to obtain a receiving signal covariance matrix:

$$R_y = E\{y_t y_t^H\} = R_h + \sigma^2 I = A R_x A^H + \sigma^2 I$$

wherein $R_h = E\{h_t h_t^H\}$ and $R_x = E\{x_t x_t^H\}$;

vectorizing the covariance matrix $R_y$ to obtain a vector z:

$$z = vec(R_y) = \tilde{A} p + \sigma_m^2 \vec{I}_m$$

wherein $\tilde{A} = A^* \odot A \in C^{|M|^2 \times L}$, $p = [g_1^2 \sigma_1^2, \ldots, g_L^2 \sigma_L^2]^T$, $g_l^2$ and $\sigma_l^2$ respectively represent a transmission signal power and a path gain power, $1 \leq l \leq L$, $\sigma_m^2$ is a noise power, $\vec{I}_m = [e_1^T, e_2^T, \ldots, e_M^T]^T$, $e_i$ is a column vector, except that the $i^{th}$ position is 1, the rest are 0, the vector z is equivalent to receiving data with an array manifold matrix $(A^* \odot A)$, and array element positions of the vector z are given by a set $D = \{d_i - d_j\}$, $\forall i, j = 1, 2, \ldots, M$, $d_i$ represents a distance from an $i^{th}$ array element to the reference array element, repeated elements in the set D are deleted to obtain a set B, integer elements of the set B correspond to positions of virtual array elements, the repeated data in the receiving data z are removed and corresponding rows are rearranged to cause the rows to correspond to the positions of the virtual array to obtain a new vector:

$$\tilde{z} = A_B p + \sigma_m^2 e_0$$

wherein $\tilde{z} \in C^{|B| \times 1}$ is a receiving signal of the virtual array, and $A_B \in C^{|B| \times L}$ is an array manifold matrix corresponding to the virtual array, $|B| = M + 2(M_1 + (M_1 + 1)M_2)$, $e_0 \in C^{|B| \times 1}$, and except that a central term is 1, the rest are 0;

reconstructing the received data $\tilde{z}$ into a covariance matrix $$\tilde{R}_y \in C^{\left(\frac{|B|+1}{2}\right) \times \left(\frac{|B|+1}{2}\right)}$$

of the virtual array, the matrix $\tilde{R}_y$ having a toeplitz matrix property, that is, elements on the same diagonal line being the same, so during construction of the matrix $\tilde{R}_y$, only constructing data in a first column and a first row, constructing previous $$\frac{|B|+1}{2}$$

data in the vector $\tilde{z}$ into a first column of the matrix $\tilde{R}_y$, constructing last $$\frac{|B|-1}{2}$$

data in me vector $\tilde{z}$ into a first row of the matrix $\tilde{R}_y$, and then complementing $\tilde{R}_y$ according to the property that the elements on the same diagonal line of $\tilde{R}_y$ are the same; based on feature value decomposition of $\tilde{R}_y$, representing:

$$\tilde{R}_y = [U_S \ U_N] \begin{bmatrix} \Sigma_S & 0 \\ 0 & \Sigma_N \end{bmatrix} \begin{bmatrix} U_S^H \\ U_N^H \end{bmatrix}$$

wherein $U_S$ is a signal subspace formed by a feature vector corresponding to a large feature value, and $U_N$ is a noise subspace formed by a feature vector corresponding to a small feature value;

multiplying both sides of the matrix by $U_N$ to obtain:

$$\tilde{R}_y U_N = (A_1 R_x A_1^H + \sigma_m^2 I) U_N = \sigma_m^2 U_n,$$

wherein $A_1 \in C^{(|B|+1)/2 \times L}$ represents an array manifold matrix corresponding to the virtual array and meets:

$$A_1 R_x A_1^H U_N = 0$$

since a column vector of $A_1$ corresponds to a signal transmitting direction, a direction of a signal source is estimated by the characteristic; based on a multiple signal classification algorithm, defining a spatial spectrum signal $P_{music}(\hat{\theta}_1)$ as:

$$P_{music}(\hat{\theta}_l) = \frac{1}{\tilde{a}(\hat{\theta}_l)^H U_N U_N^H \tilde{a}(\hat{\theta}_l)}$$

wherein in a case that a denominator $\tilde{a}(\hat{\theta}_l)^H U_N U_N^H \tilde{a}(\hat{\theta}_l)$ reaches a minimum value, $\tilde{a}(\hat{\theta}_l)$ is an $l^{th}$ column vector of the matrix $A_1$, $P_{music}(\hat{\theta}_l)$ reaches a maximum value, a direction-of-arrivals $\hat{\theta}_l$ is estimated according to a peak value of $P_{music}(\hat{\theta}_l)$, thereby obtaining all path angle information $\hat{\theta} = [\hat{\theta}_1, \hat{\theta}_2, \ldots, \hat{\theta}_L]$; and performing path gain estimation, specifically as follows:

obtaining an array manifold matrix $\hat{A}$ based on the obtained $\hat{\theta}$, sending a pilot signal $u_t$, estimating path gains in different time blocks based on the obtained $\hat{A}$, and constructing a cost function:

$$J(\hat{g}_t) = \left\| \frac{1}{u_t} y_t - \hat{A} \hat{g}_t \right\|^2 = \left( \frac{1}{u_t} y_t - \hat{A} \hat{g}_t \right)^H \left( \frac{1}{u_t} y_t - \hat{A} \hat{g}_t \right) =$$
$$\left( \frac{1}{u_t} \right)^2 y_t^H y_t - \frac{1}{u_t} y_t^H \hat{A} \hat{g}_t - \frac{1}{u_t} \hat{g}_t^H \hat{A}^H y_t + \hat{g}_t^H \hat{A}^H \hat{A} \hat{g}_t$$

minimizing the cost function to obtain a channel gain estimation $\hat{g}_t$, specifically, by calculating a partial derivative of the cost function relative to $\hat{g}_t$, obtaining:

$$\frac{\partial J(\hat{g}_t)}{\partial \hat{g}_t} = -\frac{1}{u_t} y_t^H \hat{A} + \hat{g}_t^H \hat{A}^H \hat{A}$$

in a case that $$\hat{g}_t^H \hat{A}^H \hat{A} = \frac{1}{u_t} y_t^H \hat{A},$$

a solution of the channel gain being:

$$\hat{g}_t = \frac{1}{u_t} \left(\hat{A}^H \hat{A}\right)^{-1} \hat{A}^H y_t, t = 1, \ldots, T$$

wherein T is a time block, then within one time block, the whole channel estimation result expression is:

$$\hat{h}_t = \hat{A}\,\hat{g}_t, t=1,\ldots,T.$$

\* \* \* \* \*